United States Patent Office 3,794,708
Patented Feb. 26, 1974

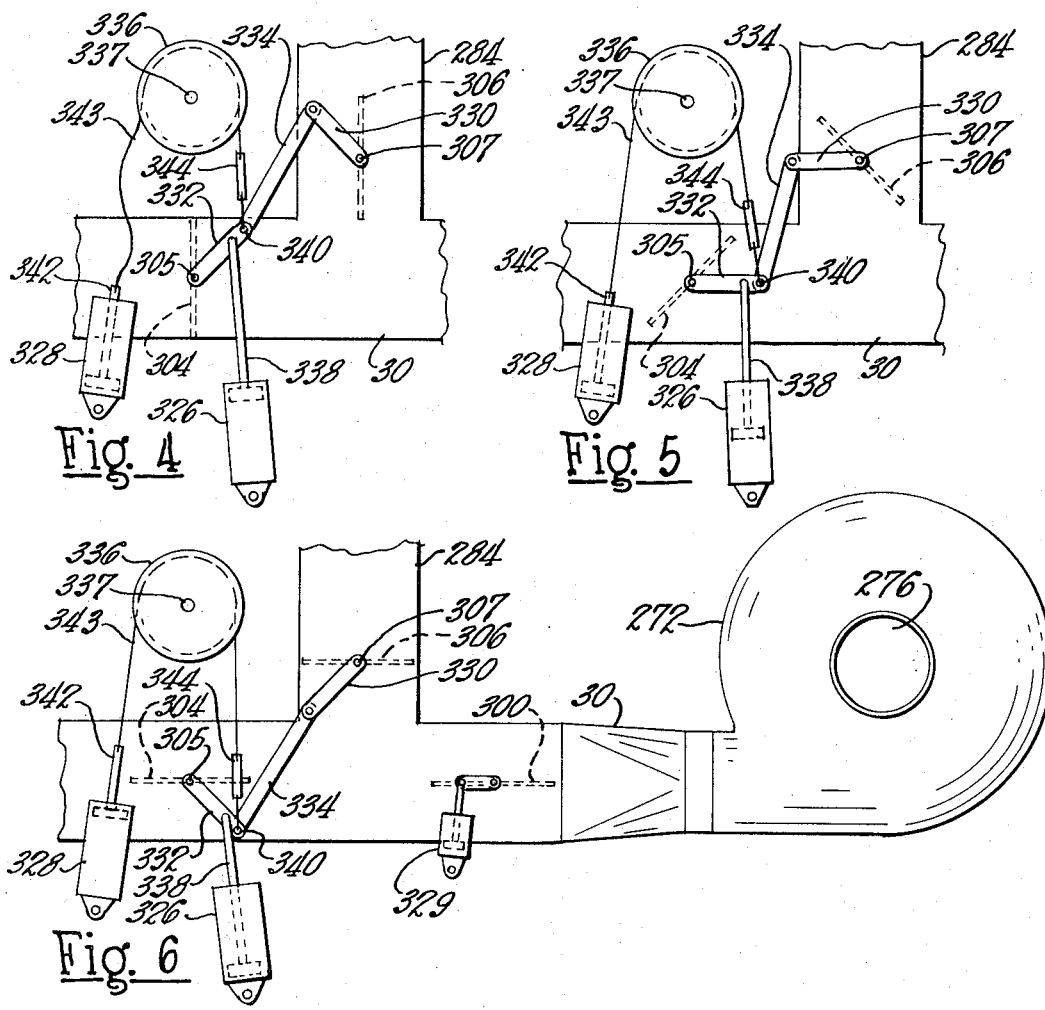

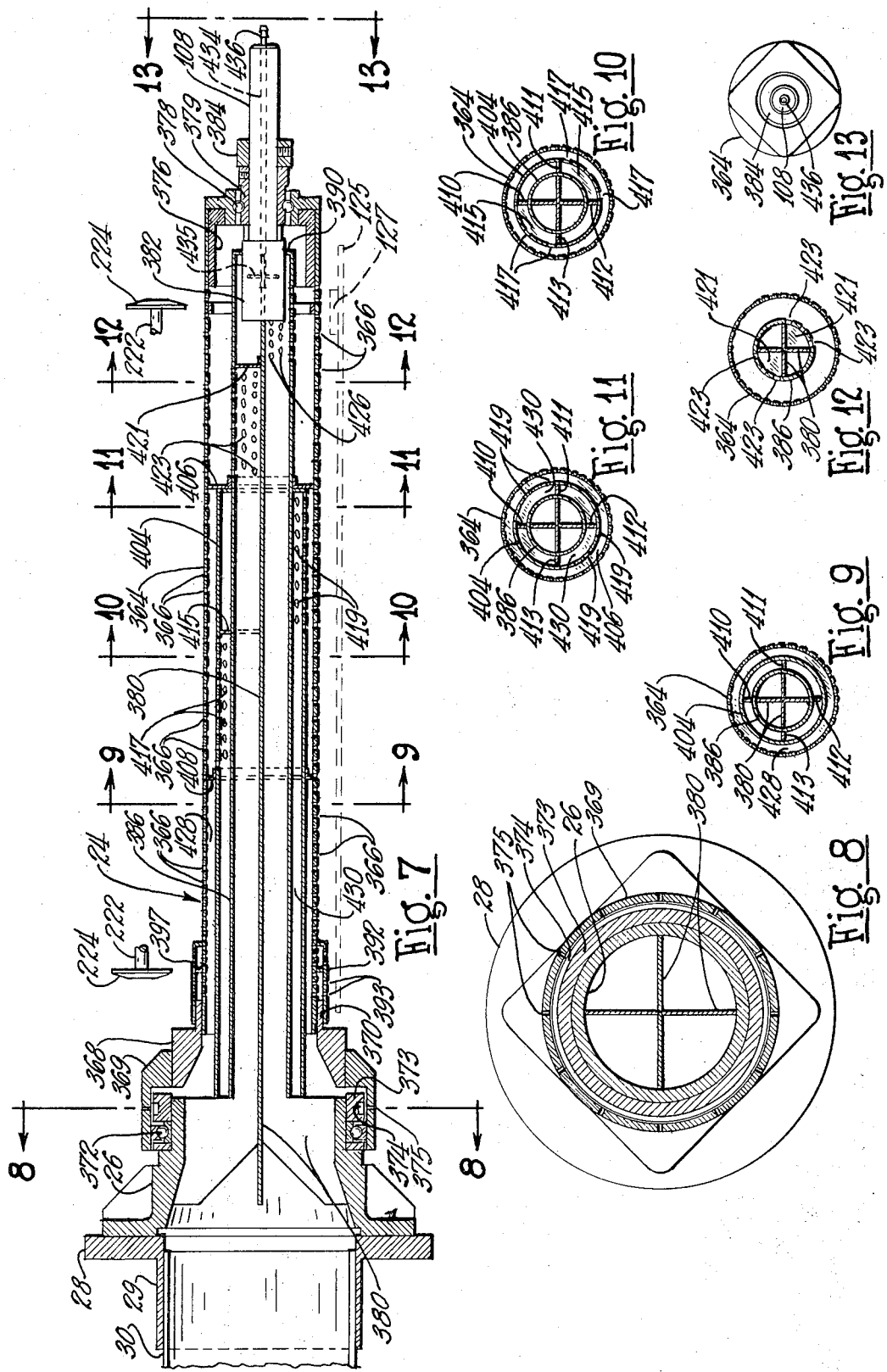

3,794,708
METHOD FOR FORMING A TUBULAR FIBROUS BODY
David O. Richards, Newark, Robert J. Beeson, Mount Gilead, and Ronald E. Kissell, Alexandria, Ohio, assignors to Owens-Corning Fiberglas Corporation
Continuation-in-part of application Ser. No. 125,833, Mar. 18, 1971, which is a continuation of application Ser. No. 781,732, Dec. 6, 1968, both now abandoned. This application Aug. 25, 1972, Ser. No. 283,876
Int. Cl. B65h 81/00
U.S. Cl. 156—189            11 Claims

ABSTRACT OF THE DISCLOSURE

A method for making a tubular fibrous body or duct section fashioned with shiplap end formations wherein the end regions of the body or section are of increased density. A mass or mat of binder-impregnated fibers, preferably mineral fibers, is wound into tubular formation on a foraminous mandrel. The fibers are compressed during the winding and a reduced pressure is established within the mandrel as an assist in collecting the fibrous mass or mat into tubular formation. A thermal treatment is then administered to the tubular body or duct section while rotating the same on the mandrel to cure the binder. Narrow end regions of the tubular body or duct section are compressed to a higher density than the main body or sections during the winding.

---

This is a continuation of our copending application, Ser. No. 125,833, filed Mar. 18, 1971, now abandoned, which is a continuation of application, Ser. No. 781,732, filed Dec. 6, 1968, and now abandoned.

Fibrous duct sections for use in conveying conditioned air for heating and cooling systems have heretofore been produced wherein a predetermined severed length of fibrous mat, such as a mat of glass fibers, is wrapped around a mandrel, the wrapped section and the mandrel then encased in a mold and heat applied to the duct while encased in the mold to set the binder. Such process used in commercial production requires a large number of mandrels and molds which are placed in an oven for a substantial period of time to cure the binder. The process involves repeated handling of the duct sections and molds necessitating considerable expense in the formation of the end product. Furthermore, in such processes, the fibrous mat is precut to length and when wrapped into a tubular configuration results in a tendency for lengthwise interior and exterior ridges to be formed in the finished product by reason of the severing of the mat presenting abrupt edges. The abrupt edges persist in the curing mold so the end product does not have a uniform wall thickness or smooth interior and exterior surfaces.

The present invention embraces a tubular body of convolutions or wraps of a mat or layer of fibers compressed to a desired density and wall thickness wherein the end regions of the section are of reduced wall thickness and increased density providing high strength interfitting overlapping ends with adjacent sections.

An object of the invention resides in the provision of a method of forming a tubular fibrous body or duct having end regions of reduced wall thickness for overlapping engagement with end regions of adjacent bodies or ducts wherein a surface of one end region of the body or duct has ridge formations to provide an effective seal when assembled with an end region of an adjacent body or duct.

An object of the invention resides in a method of forming a substantially rigid tubular body or duct of mineral fibers, such as glass fibers, in one operation at a single station involving the steps of winding a mass or mat of the fibers into tubular configuration and curing a binder in the fibers at the winding station.

An object of the invention resides in a method of forming a substantially rigid tubular fibrous product by wrapping a layer or mat of mineral fibers about a mandrel to form a multilayered product and tearing the fibrous layer or mat from the supply when a predetermined amount of mat has been fed to the mandrel, compressing the convolutions or wraps of the layer or mat to a desired density and wall thickness, and curing a binder in the fibers at the wrapping station.

An object of the invention resides in a method of forming a tubular fibrous product which includes feeding a mat or layer of binder-impregnated mineral fibers, such as glass fibers, onto a rotatable collector to collect the mat in a plurality of convolutions, engaging the major width of the mat on the rotating collector by a first moving surface to compress the convolutions of fibers to a predetermined wall thickness, and concomitantly engaging a narrow region of the convolutions of fibers to compress the narrow region of fibers to a higher density and a lesser exterior dimension than the density and exterior dimension of the fibers engaged by the first surface, and curing the binder in the fibers on the collector during engagement of the first and second surfaces with the fibers.

Another object of the invention resides in a method of wrapping a mat of fibers upon itself on a rotating collector in a plurality of convolutions, compressing the fibers of a major width of the convolutions to form a tubular body of predetermined wall thickness, compressing the fibers at one end region on the collector to provide a region of increased density and reduced wall thickness and of an interior diameter greater than the interior diameter of the formed body, and compressing the fibers of the convolutions of a narrow band adjacent the opposite end of the tubular body to compress the fibers of the narrow band to a greater density and to an exterior diameter less than the exterior diameter of the remainder of the body on the collector.

Another object of the invention embraces a method of forming a tubular fibrous body involving the steps of feeding a mat of binder-impregnated fibers from a supply to a rotating collector and wrapping successive convolutions of the mat upon itself around the collector, compressing the fibers of the convolutions by an endless belt, and establishing tension in the mat at a region between the supply of mat and the collector to stretch the mat and thereby prevent wrinkles in the convolutions in the tubular body.

Another object of the invention resides in winding a mat of binder-impregnated fibers in successive convolutions upon a mandrel and engaging the material with a moving endless belt under substantial tension exerted during the winding cycle to compress the convolutions of mat as it is collected on the mandrel, setting the binder in the fibers of the convolutions of mat on the mandrel and, during the binder setting period, reducing the tension in the belt to promote effective control of the wall thickness in the finished body.

Another object of the invention resides in a method of forming a tubular fibrous body wherein a binder-impregnated mat of glass fibers is advanced from a supply to a winding station at which the mat is wound upon itself to form a multilayered tubular body wherein the mat of fibers is compressed as it is wound into body formation, and heated gases delivered into the tubular body to set the binder in the body at the winding station.

Another object of the invention resides in the method of forming a tubular body of a mat of fibers by winding the mat in successive convolutions onto a perforated mandrel, delivering heated gases under comparatively low pressure into the mandrel to partially cure the binder in the fibers, and subsequently delivering heated air at higher pressure into the mandrel to complete the curing operation of the binder.

Another object of the invention is the provision of a method utilizing apparatus for forming a tubular fibrous body wherein an advancing mat of binder-impregnated fibers is fed to a rotating mandrel and an endless belt engages the mat as it is being wound on the mandrel to compress the fibers of the mat, the arrangement including means for establishing reduced pressure in the interior of the mandrel to adhere the fibers to the mandrel during collection of the fibers and means for delivering heated gases into the mandrel for curing the binder in the fibers while the fibers are maintained in compressed condition on the mandrel.

Another object of the invention resides in a method utilizing apparatus for winding a mat of binder impregnated glass fibers onto a rotating perforated mandrel to form a tubular body wherein one endless belt engages the mat of fibers as it is collected on the mandrel to compress the fibers and maintain the fibers under compressing during the binder curing operation, the arrangement including a second belt of narrow dimension engageable with an end region of the mat being wound on the mandrel to form a region of reduced exterior diameter and the fibers at such region compressed to a higher density while the fibers at the other end region are compressed to form an interior diameter substantially the same as the reduced exterior diameter providing for a shiplap joint when assembled with adjacent tubular bodies in end-to-end relation.

Further objects and advantages are within the scope of this invention such as relates to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 4 is a fragmentary elevational view of a damper actuating means for controlling delivery of heated air for binder curing purposes;

FIG. 5 is a view similar to FIG. 4 illustrating control dampers in an intermediate position;

FIG. 6 illustrates the position of the dampers of FIGS. 4 and 5 for delivering maximum heated air for binder curing purposes;

FIG. 7 is a longitudinal sectional view through a mandrel particularly illustrating one form of air distribution means in the mandrel;

FIG. 8 is a transverse sectional view taken substantially on the line 8—8 of FIG. 7;

FIG. 9 is a transverse sectional view taken substantially on the line 9—9 of FIG. 7;

FIG. 10 is a transverse sectional view taken substantially on the line 10—10 of FIG. 7;

FIG. 11 is a transverse sectional view taken substantially on the line 11—11 of FIG. 7;

FIG. 12 is a transverse sectional view taken substantially on the line 12—12 of FIG. 7;

FIG. 13 is an end view of the mandrel, the view being taken at the line 13—13 of FIG. 7;

While the method and apparatus of the invention are particularly usable for fashioning tubular bodies or duct sections of glass fibers particularly for use in conveying conditioned air for heating and cooling systems, it is to be understood that the method and apparatus may be utilized in forming tubular bodies of other fibers such as rock wool, slag wool or the like for other uses such as pipe insulation.

Figure 1:
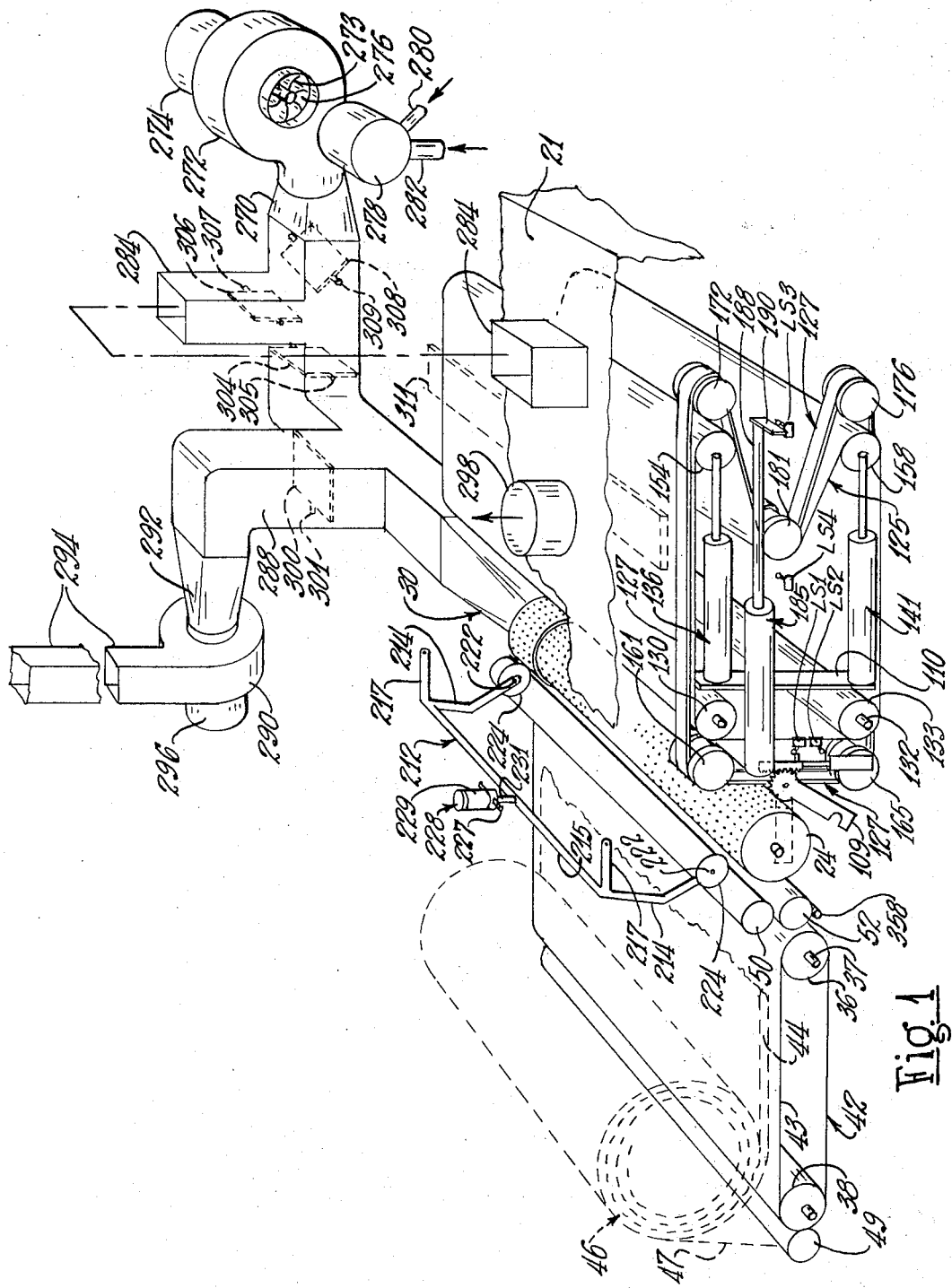
FIG. 1 is a schematic isometric view of apparatus for performing steps in the method of forming tubular fibrous bodies.
Figures 2, 3:
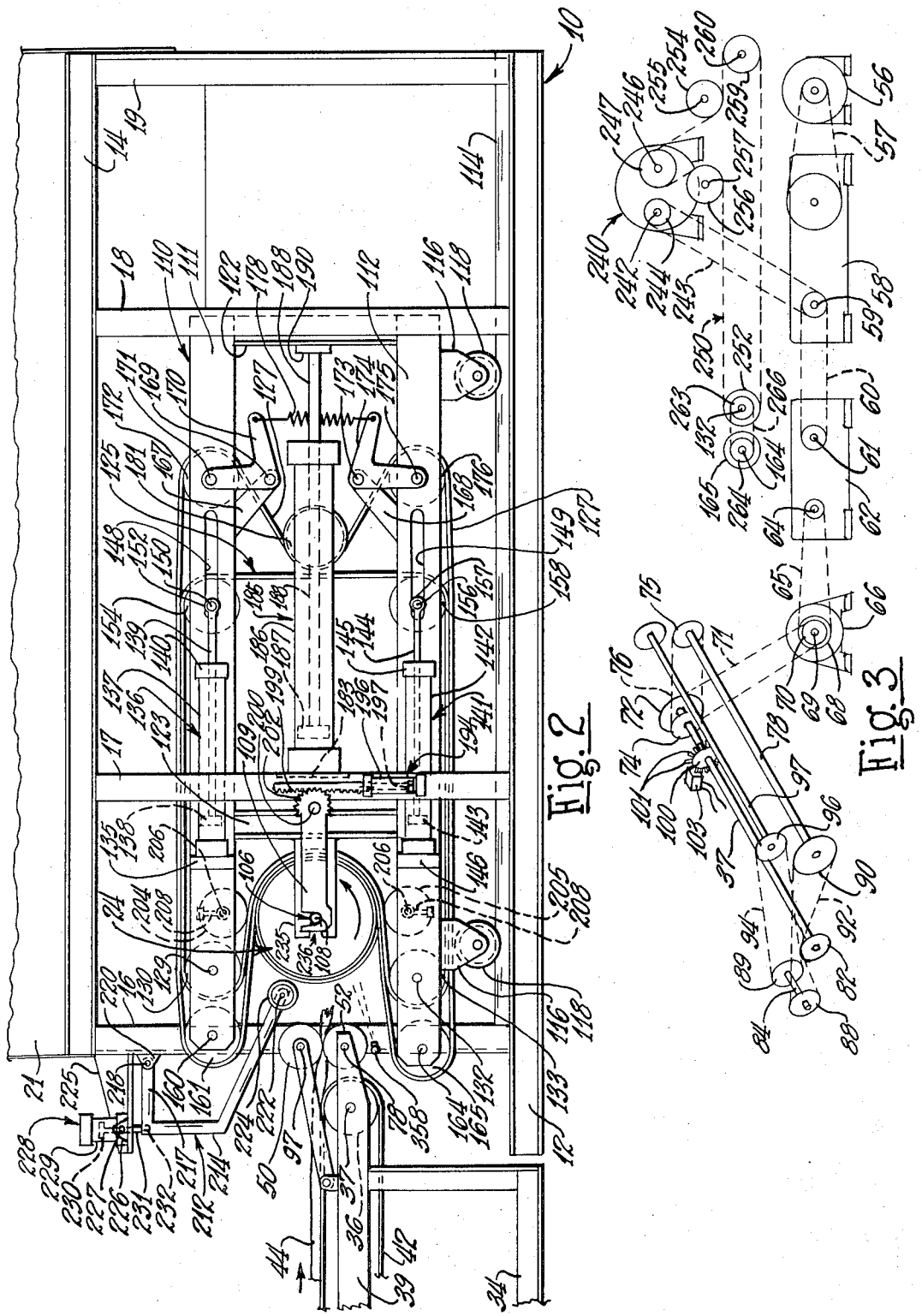
FIG. 2 is an elevational view showing components of the apparatus of FIG. 1 in a position to wind or wrap a fibrous mat upon a mandrel.
FIG. 3 is a schematic diagram of the driving arrangement for components of the apparatus shown in FIGS. 1 and 2.

Referring to the drawings and initially to FIGS. 1 and 2, the apparatus is inclusive of a main frame construction 10, is shown in FIG. 2, which includes transversely spaced base rails 12 and upper horizontal rails 14, one of each being illustrated in FIG. 2, and a single strut 16 and pairs of vertical connecting struts 17, 18 and 19. A sheet metal hood or closure 21 encloses a portion of the frame structure and more especially encloses the region adjacent the construction shown in FIG. 2.

The apparatus includes a rotatable fiber collector or mandrel 24. Mounted on a stationary frame member 26, shown in FIG. 7, is a flanged collar 28 being secured to the stationary frame member 26 and having a sleeve portion 29 which is telescoped with a main air conveying duct 30, shown in FIG. 1, for conveying air into and away from the interior of the mandrel 24 for purposes hereinafter described.

Figure 17:
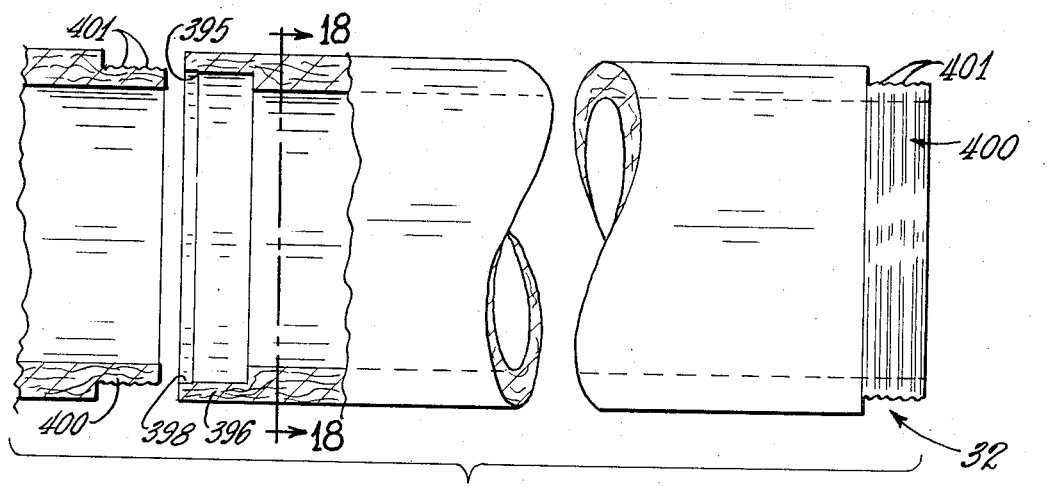
FIG. 17 is an elevational view, partly in section, of a tubular fibrous body of the invention.

The arrangement includes apparatus for conveying and feeding a mat, layer or mass of binder-impregnated glass fibers or other mineral fibers to the collector or mandrel 24 whereby the layer or mat of fibers is wound or wrapped around the mandrel 24 to deposit several convolutions of the mat upon itself on the mandrel for forming a tubular fibrous body 32, shown in FIG. 17.

A supplemental frame 34 is disposed in lengthwise alignment with the main frame 10, the supplemental frame providing support means for rolls 36 and 38 journaled in bearings mounted in a pair of frame members 39, one of which is shown in FIG. 2. The rolls 36 and 38 support an endless belt 42 of conventional wire mesh construction. The roll 36 is mounted on a shaft 37 and is driven by means hereinafter described.

The material for forming the tubular body is preferably glass fibers which have been impregnated with an uncured heat-settable binder, such as phenolformaldehyde, and a mass, layer or mat 44 of the fibers rolled into a cylindrically-shaped package 46 with a separator sheet of paper 47 disposed between the convolutions of the mat 44 in the supply package 46. The package 46 is disposed on the upper flight 43 of the endless belt conveyor 42 and the belt is moved in a right-hand direction, as viewed in FIG. 1, to advance the fibrous layer or mat 44 toward the mandrel 24.

The package 46 of fibrous mat is restrained by means (not shown) from relative movement other than rotation in unrolling the mat onto the conveyor belt. The package is supported by the conveyor belt and the friction between the mat and the advancing conveyor causes the mat to be unrolled. A take-up roll 49 driven by conventional means (not shown) collects the sheet of paper 47 as the package of mat is unrolled.

Means is provided between the belt 42 and the mandrel 24 for feeding the mat at a predetermined speed to the mandrel 24 when the mat is being collected on the mandrel 24. Such means includes an upper nip or feed roll 50 and a lower nip or feed roll 52, the advancing fibrous mat or layer 44 being moved by the upper flight 43 of the conveyor 42 between the feed rolls 50 and 52.

The drive arrangement for the feed rolls and the endless belt 42 is schematically illustrated in FIG. 3.

A motor 56 through a belt 57 drives a first positive infinitely variable speed mechanism contained in a housing 58, the output shaft 59 of the mechanism in the housing 58 being transmitted by a chain 60 to an input shaft 61 of a second positive infinitely variable speed driving mechanism contained in a housing 62. The output shaft 64 of the mechanism contained in housing 62 is transferred by a drive chain 65 to a combined clutch and brake mechanism 66 of conventional construction, the drive chain 65 engaging a sprocket 68 carried by an input shaft 69 of the mechanism 66.

A sprocket 70 connected by a drive chain 71 with a sprocket 72 drives the shaft 37 carrying the belt drive roll 36, shown in FIG. 2. Mounted upon the shaft 37 is a sprocket 74 which drives a sprocket 75 on a shaft 78 by a drive chain 76 thereby to rotate the shaft 78 on which is mounted the lower nip or feed roll 52. The shaft 37 is also provided with a sprocket 82. Mounted upon a stub shaft 84 is a first sprocket 88 and a second sprocket 89. Mounted upon the shaft 78 is an idler sprocket 90 which is engaged by a chain 92 engaging the sprockets 88 and 90, the chain 92 being driven by the sprocket 82.

The sprocket 89 is connected by a chain 94 with a sprocket 96 shown in FIGS. 2 and 3 which drives a shaft 97 carrying the upper nip or feed roll 50, shown in FIGS. 1 and 2. Through the provision of the chain 92 and the transfer sprocket 82, the feed roll or nip roll 50 is rotated in a direction opposite to the direction of rotation of the lower feed roll 52 to advance the mat or layer of fibers 44 toward the mandrel 24.

Figure 16:
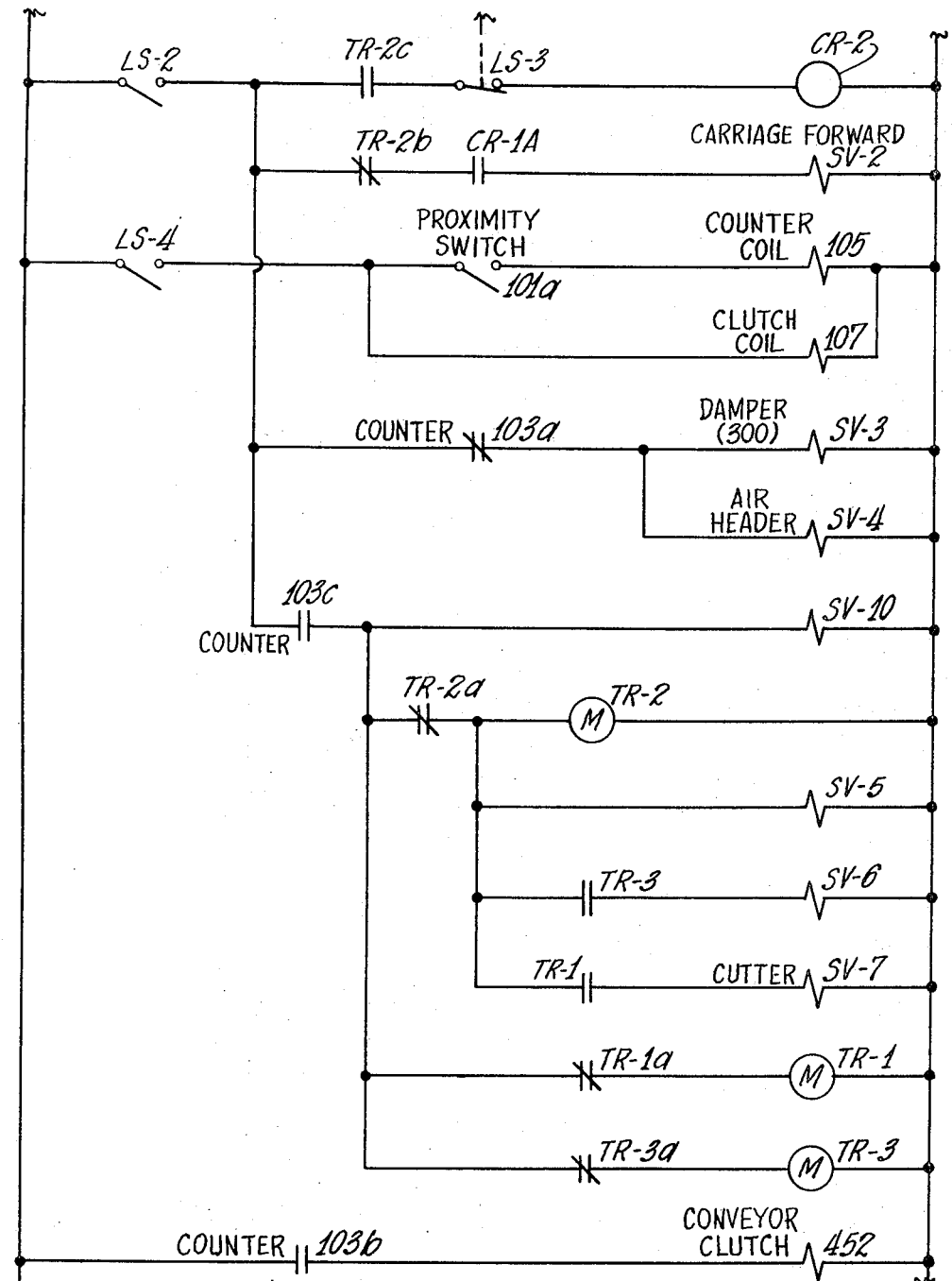
FIG. 16 is a schematic diagram of another portion of the electrical circuit.

Counting means is provided for actuating the clutch and brake means 66 for interrupting the advance of the conveyor belt 42 and rotation of the feed rolls 50 and 52 when a predetermined length or amount of mat 44 has been fed to the mandrel for forming the fibrous tube 32 thereon. As shown in FIG. 3, the shaft 37 is equipped with a disc-like member 100 having spaced peripheral projections or vanes 101. Disposed adjacent the vanes 101 is an electronic counting means 103 which has a sensitized electric field or region connected with a counter coil 105, shown schematically in FIG. 16, the counter construction being of conventional character.

In operation, the rotating projections 101 on the disc 100 influence the electrical field at the sensitized region of the counter 103 resulting in electrical impulses being transmitted to the counter coil 105. The counting unit 103 is equipped with a manually adjustable means (not shown) which may be adjusted by the operator to indicate a predetermined number of pulses, the said number of pulses being effective through the counter coil to disengage the clutch and energize the electric brake of the mechanism 66 to thereby interrupt advancement of the endless belt 42 and rotation of the feed rolls 50 and 52 when a predetermined length or amount of the fibrous mat or mass has been delivered toward the mandrel.

The apparatus includes an arrangement for effecting a winding or wrapping of the mass or mat 44 of fibers upon the mandrel 24 and for concomitantly compressing the fibers as the convolutions of mat are collected or wound onto the mandrel or collector 24. The arrangement also includes means on the mandrel for forming a recess in one end region of one end of the fibrous body to provide a female portion, and means for reducing the diameter of a narrow band of the fibrous body adjacent the other end region to provide a male portion, both portions being formed of highly compressed fibers.

The support member 26, shown in FIG. 7, for one end of the mandrel is secured to a stationary vertical frame member (not shown). The other end of the mandrel is equipped with a stub shaft 108B which is engageable in a recess 106 in a pivotally mounted retractable support arm or member 109 shown in FIG. 2. This arrangement for supporting the mandrel will be hereinafter further described, the retractable support arm 109 being provided to enable the removal of a tubular fibrous body from the mandrel and resist the thrust of the fiber compressing means. The arrangement for rotating the mandrel and compressing the fibers thereon is inclusive of a reciprocable carriage 110 having pairs of horizontal frame members 111 and 112, one of each pair being illustrated in FIG. 2.

The carriage is mounted for movement lengthwise of the main frame 10. Mounted lengthwise of the frame 10 and secured thereto is a pair of spaced parallel ways or tracks 114, one of which is shown in FIG. 2. Each of the frame members 112 is fashioned with depending brackets 116, each bracket journally supporting a grooved wheel 118, the pairs of grooved wheels 118 respectively engaging the parallel tracks 114 for guiding the carriage in a rectilinear direction. The lengthwise arranged bars or structural members 111 and 112 are connected by transverse frame members (not shown) and to pairs of vertical frame members 122 and 123, one of each being illustrated in FIG. 2.

Endless belt means are mounted on the carriage 110 for engagement with the mat or mass of fibers being wound on the mandrel to compress the fibers being collected on the mandrel. A comparatively wide endless belt 125 spans the length of the mandrel 24 and a second comparatively narrow endless belt 127 embraces a comparatively narrow band adjacent an end region of the mandrel. The endless belts 125 and 127 are of open mesh metal construction fashioned of woven wire or the like to facilitate passage of air therethrough for purposes hereinafter explained.

Journaled in hearings in the forward region of the lengthwise horizontally arranged bars 111 is a shaft 129 supporting a roll 130. Journaled in bearings at the forward region of the lengthwise arranged bars 112 is a shaft 132 supporting a roll 133 as shown in FIG. 2.

Mounted on each of the bars 111 is a projection or bracket 135, each of the brackets supporting a pneumatic or fluid actuator 136 comprising a cylinder 137, a piston 138 reciprocable in the cylinder, and a piston rod 139 connected with the piston and extending through an opening in an end head 140, as shown in FIG. 2.

Mounted upon each of the lower horizontal bars 112 is a bracket or projection 146 supporting a pneumatic actuator 141 comprising a cylinder 142, a piston 143 slidable in the cylinder and a piston rod 144 which extends through an opening in the cylinder head 145. The pairs of bars 111 and 112 are fashioned respectively with clearance slots 148 and 149. A shaft 150 extends through the slots 148 in the bars 111 and is journaled at its end regions in bearings mounted in the distal end portion 152 of the piston rod 139. Mounted on the shaft 150 is a roll 154.

A shaft 156 extends through the slots 149 in the bars 112 and is journaled at its end regions in bearings mounted in the distal end portion 157 of the piston rod 144. Mounted on the shaft 156 is a roll 158. As shown in FIGS. 1 and 2, the wide endless belt 127 embraces the rolls 133, 130, 154 and 158. Tension is established and maintained in the belt 125 by fluid pressure, such as air pressure in the left-hand ends of the pairs of actuator cylinders 137 and 142, as viewed in FIG. 2, to exert pressure in a right-hand direction on the rolls 154 and 158. As hereinafter described, the air pressure in the actuators may be varied to regulate or change the tension on the wide belt 125.

The narrow belt 127 is disposed close to and in overlapping relation with one edge region of the wide belt 125. As shown in FIG. 2, shaft 160 is journaled in bearings carried by the pairs of horizontal bars 111, the shaft 160 supporting a roll 161. A shaft 164 is journaled in bearings mounted by the pairs of horizontal bars 112, the shaft 164 supporting a roll 165. A bracket 167 is secured to and depends from one of the bars 111, and a bracket 168 is secured to and extends upwardly from one of the bars 112. Bracket 167 is provided with a stub shaft 169 upon which is pivotally supported an L-shaped member 170. One arm of the member 170 is provided with a stub shaft 171 on which a roll 172 is journally supported.

The upwardly extending member 168 is equipped with a stub shaft 173 upon which is pivotally mounted an L-shaped member 174, a depending arm of member 174 supporting a stub shaft 175 on which a roll 176 is journally mounted. A contractable coil spring 178 is connected to the ends of the other arms of brackets 170 and 174 in the manner shown in FIG. 2. Journally mounted upon a frame member of the stationary frame 10 is a roll 181. The narrow belt 127 engages the roll 181 in the manner shown in FIG. 2.

Means is provided for moving the carriage 110 forwardly on the rails 114 to engage the belts with the mandrel and to disengage the belts from contact with the tubular fibrous body formed on the mandrel when the carriage is moved in the opposite direction.

Secured to each of the stationary vertical frame members 17 is a member 183. Secured to the members 183 are the heads of two pneumatic actuators 185, each comprising a cylinder 186 containing a reciprocable piston 187 connected with a piston rod 188.

The piston rod extends through the other end head of the cylinder and is equipped with a member 190 secured to a member 122 forming a part of the carriage frame. The components in FIG. 2 are illustrated in a position wherein the endless belts are in engaging and embracing relation with the mandrel 24. By introducing fluid such as air under pressure, into the left-hand ends of the cylinders 186, the pistons 187 and rods 188 are moved in a right-hand direction, moving the carriage 110 in a right-hand direction to disengage the belts from contact with the mandrel or the fibrous body, the components in such retracted position being illustrated in FIG. 1.

The arm or member 109 for supporting the shaft means 108 at the distal end of the mandrel 24 is mounted for pivotal movement to mandrel-supporting and retracted positions in order that the finished tubular fibrous body may be slidably removed lengthwise from the mandrel 24. As shown in FIG. 2, there is mounted upon the stationary vertical strut or frame member 17 a pneumatic actuator 194 comprising a cylinder 196 in which a piston 197 is reciprocably disposed, the piston rod being equipped with a toothed rack member 199.

The arm 109 is pivoted upon a stub shaft 200 and an arcuate portion of the arm is fashioned with teeth 202 in mesh with teeth of the rack bar 199. By directing fluid pressure alternately into the opposite ends of the cylinder 196, the arm 109 may be moved from mandrel supporting position to a retracted position.

Adjustable means is provided for controlling the thickness of the wall of the tubular fibrous body and for sizing the body so that the wall thickness is uniform throughout the body. As shown in FIG. 2, there is provided a pair of back-up or sizing rolls 204 and 205 mounted upon shafts 206. The shafts 206 are supported upon the carriage frame by conventional adjustable means 208 for adjusting the back-up or sizing rolls toward or away from the axis of the mandrel to thereby regulate or control wall thickness of the tubular body, the rolls 204 and 205 being arranged for engagement with the endless belt 125.

Means is provided for severing the end regions of the tubular body on the mandrel to the desired length after the binder curing operation is completed. As shown in FIGS. 1 and 2, the body severing means is inclusive of a skeleton frame 212 including transversely spaced arm portions 214 connected by a tubular member 215. The arm portions 214 are fashioned with projecting portions 217 which, as shown in FIG. 2, are pivotally supported by pivots 218 on bracket means 220 secured to the vertical struts 16 of the main frame 10.

As particularly shown in FIG. 2, the arm portions 214 are configurated to provide operating clearance for the rolls supporting the endless belt 127. The lower ends of the arm portions 214 are provided with stub shafts or shaft means 222 on which rotary cutters 224 are journally mounted for free rotation. The body severing instrumentality in the embodiment illustrated is adapted to be held away from body severing position by fluid pressure and to move by gravity to body severing position by venting or releasing the pressure.

As shown in FIG. 2 a member 225 is secured to the main frame 10 and extends forwardly of the frame. Supported on the member 225 are projections 226 journally accommodating pins 227 carried by a cylinder 229 of a pneumatic actuator 228. A piston 230 is reciprocable in the cylinder 229 and the piston rod 231 connected to the frame 212 by pivotal means 232.

The piston 230 is normally held in elevated position by air pressure in the cylinder beneath the piston and the frame 212 normally maintained in elevated position with the cutters 224 spaced from the mandrel and a tubular body that may be disposed on the mandrel. At the completion of the formation of a tubular fibrous body on the mandrel and, after the binder curing operation is completed, the air pressure beneath the piston 230 is vented or released, permitting the frame 212 to swing downwardly by gravity engaging the cutters 224 with the tubular body on the mandrel for severing the tubular body to a predetermined length.

The carriage 110 is provided with means for supporting the shaft 108 of the mandrel construction when the carriage is advanced to its forward position in order to provide stability for the mandrel during the formation of a tubular body. As shown in FIG. 2, a mandrel support or mandrel stabilizing member 235 is welded or otherwise secured to the vertical strut 123 of the carriage 110. The distal end of the member 235 is fashioned with an open-ended slot or recess 236.

When the carriage is in its extreme forward position, the shaft portion 108 of the mandrel construction is nested in the recess 236 of the member 235 and is disposed in the recess 106 of the arm 109, the arm 109 being in its elevated or mandrel supporting position, as shown in FIG. 2. When the shaft 108 is disposed or nested in the recess 106, the forwardly directed forces against the mandrel established by tension in the belts 125 and 127 are resisted by the arm 109 so that the shaft 108 is maintained nested in the recess 236 of the arm 235 during the period that the carriage is in its forward position and the belts are in engagement with the mandrel or the mat of fibers wound on the mandrel.

The arrangement for driving the endless belts 125 and 127 is schematically illustrated in FIG. 3. Fixedly mounted on the stationary frame 10 is a housing 240 containing power transmission gearing. An input shaft 242 of the power transmission gearing is rotated by the output shaft 59 of the variable speed mechanism in housing 58 by a chain 243 engaging a sprocket 244.

The output shaft 246 of the power transmission mechanism is equipped with a sprocket 247. A chain 250, driven by the sprocket 247, engages a sprocket 252 mounted upon the shaft 132, shown in FIG. 2, which supports a belt engaging roll 133 which drives the wide belt 125.

The belt driving chain 250 is in engagement with two idler sprockets 254 and 256 respectively mounted on shafts 255 and 257. The shafts 255 and 257 are journally supported by fixed means (not shown) mounted on the stationary frame 10. The drive chain 250 engages a third idler sprocket 259 mounted on a shaft 260 journally supported by means mounted on the movable carriage 110, the sprocket 259 being movable with the carriage. Through this arrangement, the wide belt 125 is driven in the direction of the arrow adjacent the mandrel, shown in FIG. 2, to rotate the mandrel in a counterclockwise direction to wrap the mat of fibers around the mandrel when the carriage is in the forward or operative position, shown in FIG. 2.

It is preferable that the roll 133, which is adjacent the mandrel 24, be utilized as the belt driving roll as the major tension in the belt is in the lower flight of the belt moving into engagement with the drive roll 133. Thus, the region of lesser tension in the belt is at the zone of the belt leaving the drive roll 133 for movement about the mandrel. By this arrangement, the tension in the belt does not increase the pressure exerted by the belt on the fibrous mat during the winding operation so that the tension in the belt may be accurately controlled by the air pressure exerted against the pistons 138 and 143 in the respective actuators 136 and 141.

Fixedly mounted on the shaft 132 carrying the roll 133 is a sprocket 263. A sprocket 264 is fixedly secured to the shaft 164 which supports the drive roll 165. A chain 266 connects the sprockets 263 and 264 for driving the narrow belt 127, the shaft 164 being journally supported by the carriage 110 is movable with the carriage. With reference to FIG. 3, the sprockets 259, 252 and 264 are journally supported on the carriage, while the idler sprockets 254 and 256 have their axes relatively fixed, this arrangement facilitating movements of the carriage while maintaining the drive chain 250 in engagement with the driven sprocket 252.

The method of the invention involves the steps of exhausting air from the interior of the perforated mandrel during the operation of wrapping the fibrous mass or mat 44 upon the mandrel 24 to assist in holding the material on the mandrel, and for delivering heated air into the mandrel and outwardly through perforations or small openings in the mandrel wall and through the fibers on the mandrel for setting the binder in the fibers to provide a substantially rigid tubular body of fibers. The mandrel embodies an interior baffle construction for effective distribution of the heated air delivered into the mandrel to promote substantially uniform curing of the binder throughout the convolutions of the mat or mass of fibers collected on the mandrel, the baffle arrangement being hereinafter described.

Figure 14:
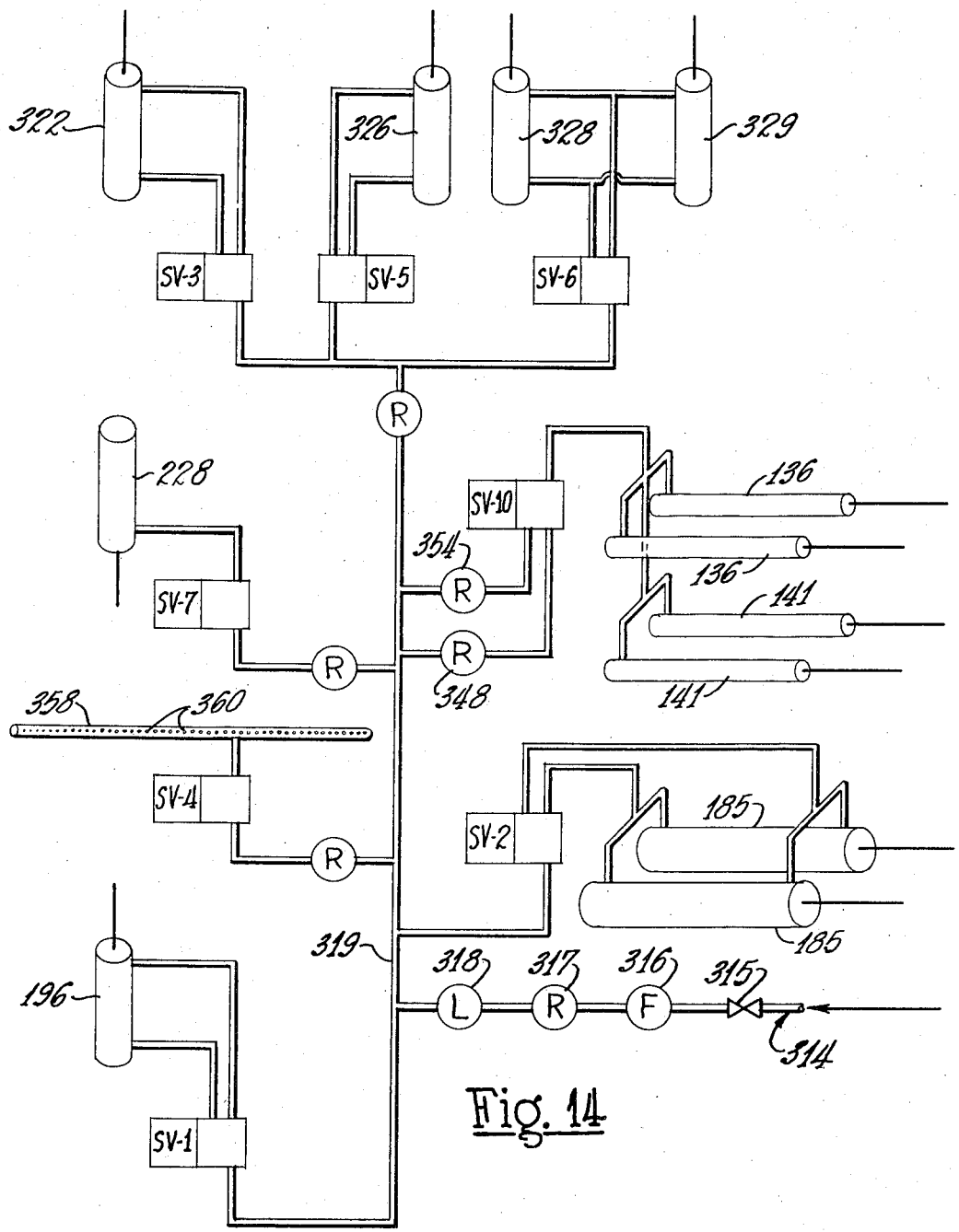
FIG. 14 is a schematic diagram of air actuated components of the system.

FIGS. 1 and 4 through 6 illustrate the air conveying and control system and FIG. 14 illustrates schematically the air actuated components for controlling air flow through the system. Referring particularly to FIG. 1, there is illustrated a main tubular air conveying duct 30, one end of which is telescoped into the sleeve portion 29 of the mandrel support means shown in FIG. 7. The opposite end region 270 of the duct 30 is connected with the outlet of a blower 272, the impeller 273 of the blower 272 being driven by a motor 274.

The blower 272 has a central air inlet passage 276. Disposed adjacent the gas entrance 276 of the blower is a means for supplying heated gases to the entrance 276. In the embodiment illustrated, the heat supply means comprises a combustion burner 278 of conventional construction embodying an open-ended combustion chamber aligned with the entrance 276 of the blower 272. Combustible gas under comparatively low pressure is delivered from a supply (not shown) through a pipe 280 to the combustion chamber of the burner, and air is supplied under low pressure to the combustion chamber through a pipe 282.

In operation, the mixture of combustible gas and air is ignited in the combustion chamber of the burner and the hot gases of combustion directed toward and into the entrance 276 of the blower thereby heating the air drawn into the entrance or passage 276.

Connected with the main air duct 30 is a transfer branch duct 284 which is adapted to convey heated gases into the hood or chamber 21 during a period in the operation of the apparatus, the heated gases being delivered into the region of the fiber-compressing belts 125 and 127.

As hereinafter explained, the heated gases during a certain period in the operation are conveyed through the duct 284 into the hood to maintain the belts at an elevated temperature to prevent or minimize adherence of the binder in the fibrous mass to the belts. As shown in FIG. 1, a branch duct 288 is connected with the main duct 30, a suction blower 290 of conventional construction being connected with the duct 288 through a tapered duct portion 292. The suction blower 290 effects air flow through the fibers being collected on the mandrel to assist in adhering the fibers to the mandrel, a stack 294 delivering the air from the blower to the atmosphere.

The suction blower 290 is of conventional construction having an impeller (not shown) driven by a motor 296. A second stack 298 is provided for the hood 21 for venting the hood to the atmosphere, the stack 298 preferably extending through a roof (not shown) housing the apparatus. Dampers or regulating means are provided in the main duct 30 and branch ducts 284 and 288 for controlling direction and flow of air or gases of combustion through the ducts. Disposed in the vertical air exhaust duct 288 is a damper or air regulating member 300, shown in FIG. 1, the damper being supported upon a shaft 301 projecting through openings in the walls of the duct and providing for pivotal movement of the damper.

As shown in FIGS. 1 and 4 through 6, a second damper 304 is disposed in the main duct 30 intermediate the connections of the main duct 30 with the branch ducts 284 and 288, the damper 304 being mounted upon a shaft 305 journaled in openings in opposed walls of the duct. Disposed in the vertical duct 284 is a third damper 306 mounted upon a shaft 307 journaled in openings formed in opposed walls of the duct 284. A fourth damper 308 is disposed adjacent the region 270 of the duct 30 between the blower 272 and the branch duct 284, the damper 308 being mounted on a shaft 309 journaled in openings in opposed walls of the duct.

The suction blower 290 establishes reduced pressure in the mandrel during the mat winding operation by exhausting air from the interior of the mandrel and discharging the air through the stack 294. During the mat winding operation, the damper 300 is in a full open position and damper 305 is in a closed position. Except during the binder setting or curing period, the heated gases from the blower 272 are conveyed through the duct portion 270 past the partially opened damper 308 and the opened damper 306 into the hood 21 to maintain the endless wire mesh belts 125 and 127 in a heated condition but at a temperature lower than the curing temperature of the binder in the fibers, the dampers 300 and 304 being in closed position.

By maintaining the endless belts in a stabilized heated environment, the belts are not subjected to appreciable variations in temperature, thus minimizing expansion and contraction of the belts, the heated environment also reducing the binder curing time. Additional heat for the environment of the endless belts may be provided by a radiant gas heater shown in broken lines in FIG. 1.

The dampers are actuated by pneumatic actuators which are controlled by electrically actuated solenoid valve means hereinafter explained in connection with the pneumatic and electrical circuit diagrams. The actuators for the dampers are of the conventional cylinder and piston type.

FIG. 14 illustrates schematically the air operated actuators and the compressed air lines for operating the actuators through solenoid actuated valves. With reference to FIG. 14, a pipe 314 is connected with a compressed air supply of about one hundred pounds per square inch, an air control valve being shown at 315.

The compressed air, as is conventional in air actuated systems, is passed through a filter 316, a pressure regulator 317 and lubricant introduced into the air line by a lubricator 318, the compressed air being conveyed through a main line 319. Referring to FIGS. 1 and 14, the damper 300 in the duct 288 is actuated by a pneumatic actuator 322. The dampers 304 and 306 are actuated and controlled by linkage interconnecting the shafts supporting the dampers and by two pneumatic actuators 326 and 328.

As shown in FIGS. 4 through 6, an arm 330 is fixed on the shaft 307 and an arm 332 is fixed on the shaft 305. The arms 330 or 332 have their distal ends pivotally connected to the respective ends of an intermediate link 334. Disposed above the arm 332 is an idler sheave 336 which is journaled on a fixed support (not shown) by a stub shaft 337. Piston rod 338 of the actuator 326 is pivotally connected to the arm 332 intermediate its ends and adjacent the pivot connection 340 of the arm with the link 334.

The piston rod 342 of the actuator 328 is connected to one end of a flexible cable 343 engaging the idler sheave 336, the other end of the cable being connected with the pivot 340. A turnbuckle 344 is associated with the cable 343 to vary the positions of the dampers 304 and 306 with respect to the pistons of the actuators. The dampers 304 and 306 are arranged to be moved to three positions illustrated in FIGS. 4, 5 and 6. The dampers 304 and 306 are in the positions shown in FIG. 4 during the winding of the fibrous mat on the mandrel, FIGS. 5 and 6 illustrating the positions of these dampers during two curing periods or cycles of the binder in the fibers on the mandrel.

The actuator 326 is actuated to move the dampers 304 and 306 to the relative positions shown in FIG. 5, these positions providing for partially restricted flow of heated air into the mandrel for an initial or partial curing of the binder.

The dampers 304 and 306 are held in their intermediate positions because the piston of the actuator 326 is restrained in an intermediate portion by air pressure above the piston in the actuator 328 even though there is air pressure above the piston in the actuator 326.

After the initial or partial curing time has lapsed, the air pressure above the piston in the actuator 328 is vented or released by means hereinafter described. This action permits the piston in the actuator 328 to move upwardly and, as air pressure is existent above the piston in the actuator 326, the piston in the actuator 326 moves to its lowermost position to thereby move the dampers 304 and 306 to the positions shown in FIG. 6.

As shown in FIG. 6, the damper 306 closes the duct 284 and the damper 304 is in its full open position so that heated air under maximum pressure and velocity from the blower 272, is conveyed through the duct 30 to the interior of the mandrel 24 to complete the curing or setting of the binder in the fibers of the body on the mandrel. When the total cure cycle is completed, compressed air is admitted by valve means into the lower end of the actuator 326 and into the upper end of the actuator 328, thereby actuating the linkage to return the dampers 304 and 306 to their initial positions shown in FIG. 4.

The compressed air in the actuators 236 and 141 is maintained at a pressure effective to compress the fibers on the mandrel during the winding of the mat on the mandrel.

When a predetermined length or amount of mat 44 has been fed to the mandrel, the air pressure in the belt tension actuators 136 and 141 is substantially reduced to reduce the compression pressure of the belt 125 on the fibers of the mat wound on the mandrel preparatory to the binder setting operations. The reduced pressure may be manually adjusted by a regulator 354 shown in FIG. 14.

When the rotation of feed rolls 50 and 52 is interrupted after the desired amount of fibrous mat has been wound on the mandrel as determined by the counter, continued rotation of the mandrel under the influence of the belts 125 and 127 causes the mat to be torn between the feed rolls and the mandrel 24. This tearing action causes a feathering or thinning of the ends of the mat at the torn regions. The method step of tearing the mat in lieu of severing the mat is an important feature in the formation of the fibrous body as hereinafter explained.

In order to effectively convey the mat from the feed rolls to the mandrel in initiating the formation of a succeeding fibrous body, means is provided for directing the mat into proper engagement with the mandrel. As shown in FIGS. 1, 2 and 14, a manifold or header 358 is disposed lengthwise and beneath the feed roll 52. The manifold or header 358 is provided throughout its length with one or more rows of orifices or outlets 360 shown in FIG. 14 through which jets or streams of air are delivered directed toward the mandrel to support the mat so that it properly engages the mandrel.

The flow of compressed air to the manifold is controlled by means hereinafter described whereby jets of air are delivered from the manifold whenever rotation of the feed rolls 50 and 52 is initiated at the start of the formation of a fibrous body on the mandrel.

The mandrel construction 24 is particularly illustrated in FIGS. 7 through 13 and embodies internal components and baffles of a character to secure substantially uniform distribution of air delivered through orifices or outlets throughout the peripheral area of the mandrel so as to attain uniform curing of the binder in all regions of the fibrous tubular body. The mandrel 24 includes a cylindrical metal shell or tube 364 fashioned throughout substantially its entire area with outlets or openings 366, the openings being about $3/16$ of an inch or more in diameter.

The mandrel construction is inclusive of a head 368, the head including a sleeve-like member 369 secured to member 368. The head member 368 is fashioned with a sleeve portion 370, one end of the mandrel shell 364 being telescoped into and welded to the head member 368. Mounted upon the stationary member 26 is an antifriction or ball bearing 372, the sleeve member 369 of the mandrel head construction being journally supported for rotation on the bearing 372. Disposed adjacent the ball bearing 372 is an annular band or ring 373 cooperating with the sleeve portion of head member 369 providing a means to prevent appreciable loss of air from the interior region of the mandrel.

The annular band 373 is fashioned with a peripheral recess 374 which is in registration with peripheral openings or vents 375 to vent any air moving past the sealing band 373 to protect the bearing 372 from the heated air. The other end of the mandrel shell 364 is fitted over a sleeve 376 to which is secured the outer race of an antifriction or ball bearing 378.

The stationary support member 26 is fashioned with a centrally disposed web structure 380 of Greek cross-like cross section, the web structure extending substantially full length of the mandrel. Welded to the end region of the web construction 380 is an enlarged cylindrical portion 382 of the shaft 108, the web portion 380 and the shaft 108 being stationary. The inner race 379 of the bearing 378 is secured to the shaft 108. A clamp or collar 384 is secured to the shaft 108 and abuts the ball race member 370. An inner thin-walled tubular member 386 surrounds the web portion within the mandrel shell 364 and is welded or otherwise secured to the web structure.

The tube 386 terminates adjacent the enlarged portion 382 of shaft 108 and has an inwardly extending flange 390 welded to the shaft portion 382. The end region of the web structure 380 is welded to the enlarged portion 382 of shaft 108. Mounted upon the left-hand region of the mandrel shell, as shown in FIG. 7, is a sleeve or collar 392 which is telescoped over the sleeve portion 370 of the mandrel head 368. The collar 392 is fashioned with a plurality of outlets or openings 393 to facilitate flow of air therethrough.

The collar 392 is of an exterior diameter larger than the diameter of the mandrel shell 364 to form the internal recess 395 in the tubular body 32, shown in FIG. 17, the recess 392 forming the female portion of a shiplap type of joint. Collars of different diameters and lengths are used with mandrels of different diameters where recesses of different depths are desired with fibrous tubes of different diameters and wall thicknesses fashioned according to the herein described method. The collar 392 is preferably fashioned with a peripheral stepped region 397 to provide a slightly enlarged entrance region 398 for the recess 395, as shown in FIG. 17, the enlarged entrance region 398 facilitating telescoping assembly with a male portion 400 of an adjacent tubular fibrous body.

The mandrel includes an intermediate thin-walled tube or shell 404 concentric with the shells or tubes 364 and 386. Disposed between the inner tube or shell 386 and the outer shell 364 is an annular baffle 406 spaced from the distal end of the mandrel as shown in FIG. 7. The intermediate shell or tube 404 terminates at the baffle 406, the baffle being preferably welded to the shells or tubes 364 and 386 and to the intermediate shell or tube 404.

Disposed adjacent the outer shell 364 and the intermediate tube 404 is a baffle 408 disposed in the position shown in FIG. 7, spaced about mid-way between the baffle 406 and the end of the mandrel adjacent the head 368.

Disposed between the inner shell 386 and the intermediate shell 404 are four lengthwise arranged baffles or strips 410, 411, 412 and 413 which extend from the entrance of the mandrel to the baffle 406. As shown in FIG. 10, there is disposed between the inner shell 386 and the intermediate shell 404 diametrically-arranged quadrant-shaped baffles 415. Groups of diametrically opposed openings or orifices 417 are provided in the intermediate tube 404 at the left of the quadrant-shaped baffles 415.

As shown in FIGS. 7 and 11, two seconds groups of diametrically opposed orifices or openings 419 are provided in the intermediate shell 404 at the right of the baffles 415.

Disposed between adjacent radial portions of the web 380 are diametrically-arranged quadrant-shaped baffles 421. Fashioned in the inner shell 386 between the baffle 406 and the quadrant-shaped baffles 421 are two groups of diametrically arranged openings or outlet 423. Also fashioned in diametrically-opposed regions of the inner shell 386 at the right of the baffles 421 are groups of openings or outlets 426 shown in FIG. 7.

The annularly shaped spaces or regions 428 between the outer shell 364 and the intermediate shell 404 between adjacent lengthwise strips 410, 411, 412 and 413 at the air entrance end of the mandrel provides chambers or passages through which heated air is delivered through the openings or outlets 366 provided in the outer shell 364 of the mandrel from the entrance end to the baffle 408.

The annularly shaped spaces 430 between the inner shell 386 and the intermediate shell 404 and between the adjacent lengthwise strips convey air to the groups of outlets or openings 417 and 419 for delivery through the openings 366 in the outer shell 364 in the region of the shell between the baffles 406 and 408.

The lengthwise passages or chambers provided by the inner shell 386 and the webs 380 convey air from the entrance end of the mandrel to the groups of orifices 423 and 426 for delivery through the openings or outlets 366 in the outer shell 364 between the baffle 406 and the right-hand end of the mandrel as viewed in FIG. 7. Through this arrangement, the heated air for curing the binder in the fibers on the mandrel is delivered through all of the outlets or openings 366 substantially uniformly throughout the area of the mandrel.

The relative positions of the wide belt 125 and the narrow belt 127 with respect to the mandrel is illustrated in broken lines in FIG. 7. As shown in FIG. 7, a small lengthwise passage 434 in the shaft portion 108 is in communication with radial passages 435 in shaft portion 382 opening into the interior of the mandrel. A fitting 436 is affixed to the end of the shaft 108 in communication with the passage 434. The fitting 436 is for the purpose of attaching a tube of a manometer or other pressure responsive indicator for indicating the air pressure existent within the mandrel.

Figure 19:
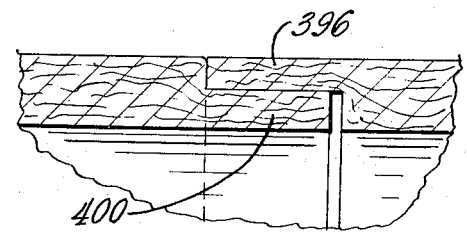
FIG. 19 is a fragmentary sectional view illustrating the overlapping regions at the juncture of tubular bodies in assembled condition.
Figure 18:
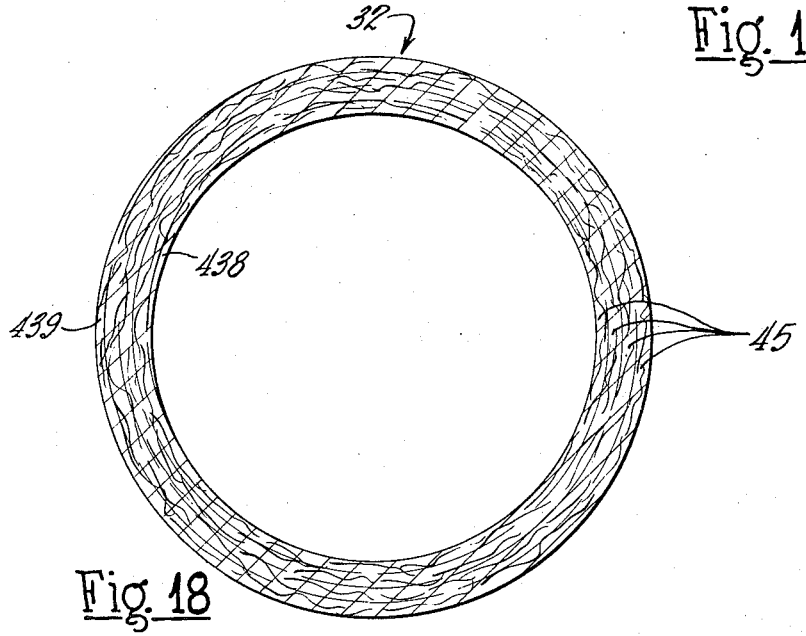
FIG. 18 is a transverse sectional view, taken substantially on the line 18—18 of FIG. 17.

In reference to FIGS. 17 through 19 illustrating the fibrous body 32, the male portion 400 is fashioned by highly compressing the fibers at this region of the body by the narrow belt 127. The wire belt 127 is of a mesh-like character and as this belt exerts high compression forces on the fibers engaged by the belt the male portion 400 is formed and the fibers therein compressed to substantially twice the density of the fibers in the main portion of the tubular body 32.

The exterior surface is replete with ridges or embossments 401 resulting from the mesh configuration of the wire belt 127 under the high compression forces of the belt exerted on the fibers. The ridges or embossments 401 present a roughened surface which, when telescoped into the female portion 396 of an adjacent tubular section 32, provides an effective seal at the interengaging surfaces of the shiplap joint effected by the telescoping interengagement of the male and female portions as illustrated in FIG. 19.

In fashioning the other end region of the tubular body with a female configuration 396, the collar 392 forms the recesss 395 providing a wall thickness for the female portion 396 substantially equal to the wall thickness of the male portion 400 formed on the opposite end of the tubular body. During the winding of the fibrous mat on the mandrel, the wide belt 125 compresses the fibers to form a substantially uniform diameter for the body throughout its length except at the region of the male portion 400. The presence of the collar 392 on the end region of the mandrel causes the fibers forming the female portion 396 to be highly compressed to substantially twice the density of the fibers in the major wall region of the tubular body.

As the fibers undergo higher compression at the female portion 396, the adjacent fibers of the major wall region of the body tend to be drawn toward the portion 396 of reduced thickness to provide high strength characteristics at this region. The same is true in the method of fashioning the male portion 400 of reduced external diameter as the fibers tend to be drawn from the major wall region of the body by the narrow belt 127 toward the reduced diameter portion 400 to provide high strength characteristics at this region of the body. The walls of the male and female portions 400 and 396 are of substantially the same thickness. As shown in FIG. 19 it is preferable that the male portion 400 be of slightly lesser length than the length of the recess 395 so that the end region of the female portion 396 abuts the shoulder of the tubular body provided by the reduced diameter of the male portion 400 to present a smooth exterior surface area at the region of the joints between adjacent sections. It is to be understood however that, if desired, the male and female portions may be of the same length.

FIG. 18 illustrates a cross section of the completed tubular fibrous body. The fibers of the convolutions 45 of the mat, under the compression pressures and in bonded condition, are effectively integrated into a unitary body. The compression pressures on the convolutions 45 of fibers tend to cause the fibers of adjacent convolutions to project from one convolution into another whereby a more effective bonding of the fibers in the body is attained and any tendency toward delamination is reduced or eliminated.

One of the features of the invention resides in the method of tearing the mat from the supply to provide feathered or thinned end regions of the mat. As illustrated in FIG. 18, the inner feathered or thinned portion 438 and the outer thinned end portion 439 of the mat under the forces of winding and compression are tapered to the extent indicated in FIG. 18 so that both the interior and the exterior surfaces of the tubular fibrous body are smooth with no lengthwise ridges either interiorly or exteriorly on the body. Furthermore, this feature provides for a substantially uniform wall thickness throughout the tubular body.

The rate of advancement of the mat by the feed rolls 50 and 52, shown in FIG. 2, is slightly less than the peripheral linear speed of the mandrel so as to effect a stretching of the mat 44 of fibers as the mat is wound in convolutions 45 on the mandrel. As the mat is in stressed condition during winding, there are no wrinkles formed in the convolutions of mat collected on the mandrel.

Fibrous tubular bodies, sections or ducts 32 fashioned according to the invention may be made in various diameters and wall thickeners by using mandrels of different diameters. In the illustrated embodiment a duct of about eight inches internal diameter is fashioned on the apparatus having a wall thickness of about one inch. The mat, layer or mass 44 of fibers before winding is about one inch in thickness and of a density of about one pound per cubic foot.

About four convolutions are wound on the mandrel as indicated in the product, shown in FIG. 18, the fibers being compressed to about one inch wall thickness and a density of about four pounds per cubic foot. It is to be understood that the mat 44 of fibers may be of different thicknesses depending upon the interior diameter and wall thickness desired in the end product. It is found that ducts may be fashioned of interior diameters of from about three to sixteen inches or more and the density of the fibers in the finished product may be from two to sixteen pounds per cubic foot depending upon the degree of rigidity desired and the end use of the product.

The density and wall thickness of the tubular body formed on the mandrel may be varied by adjusting the tension in the belt 125 by regulating the air pressure in the belt tensioning actuators 136 and 141. It should be noted in FIG. 2 that the belts embrace the mandrel through a peripheral distance on the mandrel of less than 180°. The tension in the narrow belt 127 may be varied by using a spring 178 of different tension.

The operation of the apparatus in carrying out the described method is as follows: In the description of operation it is assumed that all of the components of the apparatus are in a static position with a rolled package 46 of the binder-impregnated mat 44 of glass fibers supported on the upper flight 43 of the conveyor 42 and that the forward edge of the mat extends through the feed rolls 50 and 52, the forward edge being feathered by reason of tearing of the mat during the formation of a previous tubular body on the mandrel.

Figure 15:
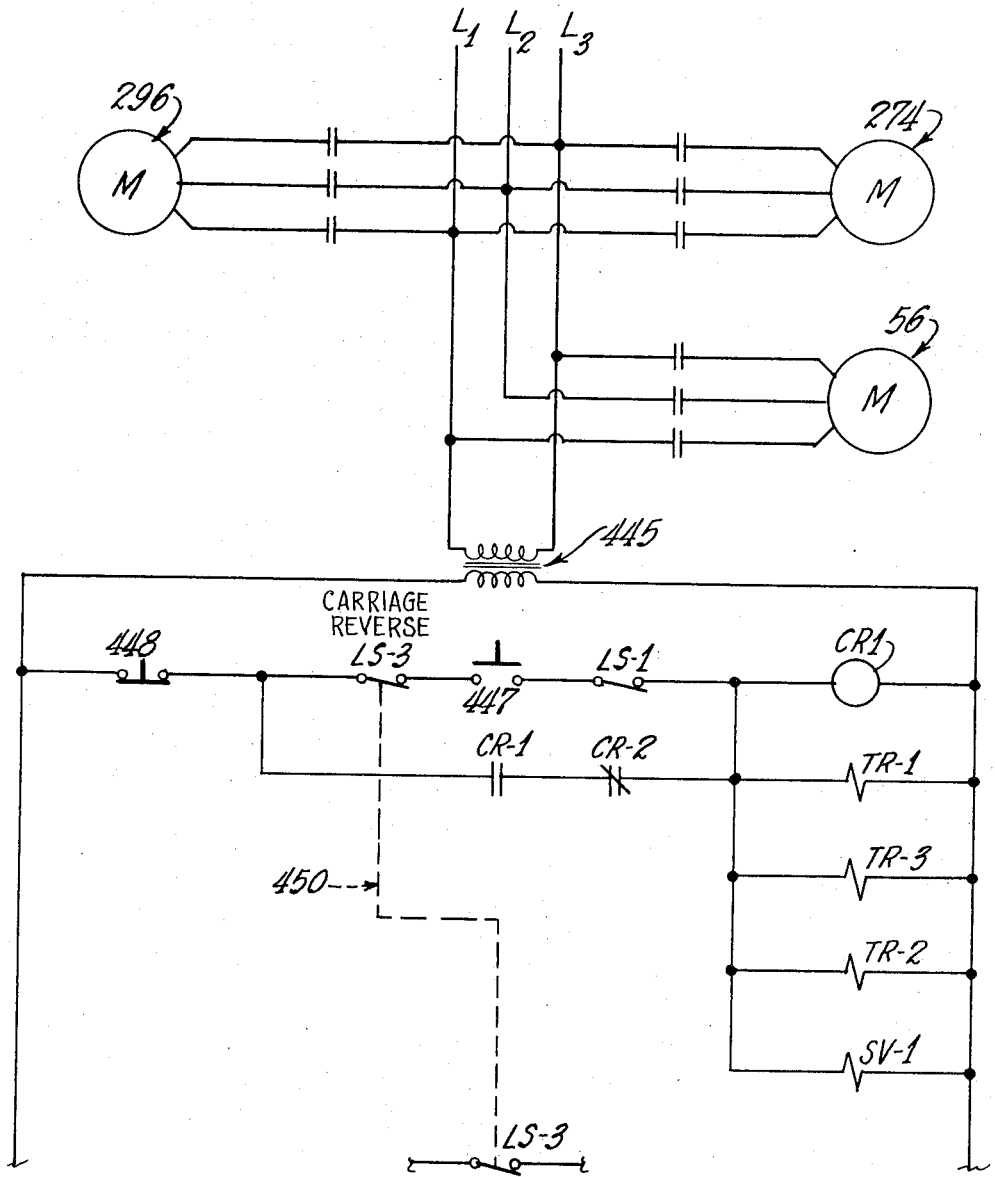
FIG. 15 is a schematic diagram showing a portion of the electrical circuit.

To initiate operation of the apparatus the operator manipulates conventional switch means (not shown) to effect current flow through lines L1, L2 and L3 to energize the motor 56 operating the drive mechanism for driving the endless belts 125 and 127 and the mat feeding components, the motor 274 driving the blower 272 and the motor 296 for driving the suction blower 290. Current is supplied to a transformer 445, shown in FIG. 15, for providing single phase current at a reduced voltage for operating the timers, switches and solenoids of the electrical control system illustrated schematically in FIGS. 15 and 16.

Combustible gas and air are delivered to the chamber of the burner 278 and the mixture ignited. The burner is operated for a period of time sufficient to heat the metal belts 125 and 127 and other components of the carriage 110 to a proper temperature, the heated gases being delivered past the open dampers 306 and 308 into the hood 21, the damper 304 being in closed position. The temperature within the hood 21 is maintained below the curing temperature of the binder in the fibers. The carriage 110 is in its retracted position with the endless belts spaced from the mandrel 24, the components being in the position shown in FIG. 1.

The mandrel support arm 109 is in retracted or down position as shown in FIG. 1. The damper 300 in the duct 288 is in closed position. The electrical circuit, shown in FIG. 15, includes a cycle start switch 447 and an emergency stop switch 448, a limit switch LS–1 for the mandrel support 109 in down position and a limit switch LS–3 for reversing the movement of the carriage. The limit switch LS–3 is a dual switch having sets of contacts connected by mechanical means indicated by the broken lines 450.

The operator closes the cycle starting switch 447. The limit switch LS–1 is closed and the two sets of contacts of limit switch LS–3 are closed so that the closing of the starting switch actuates the control relay CR–1, the control relay CR–2, shown in FIG. 16, being in closed position. Both sets of contacts CR–1 and CR–1A are in closed position. The closed contacts CR–1 establish a circuit through the solenoid valve SV–1 admitting compressed air from the supply to the upper end of the cylinder 196 of the actuator 194 and elevating the mandrel support arm 109 to mandrel-supporting position shown in FIG. 2.

Movement of the mandrel support arm 109 to mandrel-supporting position closes limit switch LS–2 and opens limit switch LS–1 shown in FIG. 1. The closing of limit switch LS–2 initiates the following actions or operations: Solenoid SV–2 is energized to admit compressed air into the right-hand ends of the cylinders of actuators 185 which moves the carriage 110 to the positions shown in FIG. 2 preparatory to winding a length of the mat or mass 44 of fibers upon the mandrel 24.

The solenoid SV–3 is actuated to move the damper 300 in the air exhausting duct 288 to full open position, and the solenoid SV–4 is actuated to a position wherein compressed air is delivered to the header 358 and air discharged through the openings 360, shown in FIG. 14. The contacts of the counter 103 are closed.

When the carriage 110 reaches its forward position with the belts 125 and 127 in embracing engagement with the mandrel, the limit switch LS–4 is closed. During these actions the dampers 306 and 308, shown in FIG. 1, are in open positions to direct hot gases delivered from the blower 272 into the enclosure or hood 21 embracing the endless belts and associated components to maintain the belts and components at a temperature in a range of from about 150° F. to about 400° F., the temperature being maintained below the curing temperature of the binder in the fibers.

The clutch coil 107 of the conveyor drive mechanism 66 is energized to effect operation of the mat-advancing conveyor 42 and rotation of the feed rolls 50 and 52 through the arrangement shown in FIG. 3 through a limit switch LS–4. The closing of limit switch LS–4 energizes the counter coil 105 which closes the counter contacts 103a and also energizes the clutch coil 107 to close contacts 103b which locks in the conveyor clutch actuator 452 and moves the mat feeding conveyor to advance the mat through the feed rolls.

Rotation of the transfer shaft 37, shown in FIG. 3, rotates the disc 100 of the counter mechanism, the counter coil being energized by pulses from the vane operated proximity switch 101a, the pulses being produced by the projections 101 moving past the sensitized region of the counter unit 103 shown in FIG. 3. As soon as the conveyor belt is moving and advancing the mat 44, the alternate opening and closing of the proximity switch sets up pulses transmitted to the counter coil 105.

The number of counts or pulses of the proximity switch determines the length of mat 44 delivered to the mandrel and the operator predetermines the amount of mat to be fed to the mandrel by a manual setting of the counter.

As the mat is fed to the mandrel 24 by the feed rolls 50 and 52, the moving belts 125 and 127 wraps the mat of fibers 44 around the mandrel 24. When the proximity switch had fed the requisite number of pulses to the counter coil determining the length of mat to be wound to form the body on the mandrel, the counter 103b counts out and disengages the conveyor clutch actuator 452 which brings into operation an electric brake in the clutch means 66 to stop the advancement of the conveyor 42 and interrupt rotation of the mat feeding rolls 50 and 52.

During the wrapping or winding of the advancing mat 44 around the perforated mandrel by the endless belts 125 and 127, the suction blower 290 is exhausting air from the interior of the tubular mandrel and through the perforations in the mandrel, the suction holding the mat on the mandrel. The fibers of the convolutions 45 of the mat on the mandrel are continuously compressed by the pressure of the wrapping belts 125 and 127 to increase the density of the fibers on the mandrel and form a tubular body on the mandrel. The back-up or sizing rolls 204 and 205 are adjusted whereby the exterior dimension of the fibrous body on the mandrel does not exceed a desired size.

The mandrel and the fibers thereon continue to rotate under the influence of the moving belts, but when the feed rolls 50 and 52 are locked against further rotation, the mat 24 is torn at the region between the mandrel and the feed rolls. The tearing action provides a feathering out or thinning of the torn end regions of the mat and the trailing feathered end region being wrapped on the mandrel as the final convolution provides a smooth exterior surface on the fibrous body without any ridges. The torn feathered end region of the supply mat is initially wound on the mandrel in the formation of the succeeding body and provides for a smooth interior surface in the tubular fibrous body or duct.

The counter contacts 103a are opened and counter contacts 103c are closed, the closing of the latter completing a circuit through the solenoid SV–10 which is moved to a position to reduce the pressure of air in the actuators 136 and 141, the reduced pressure being determined by the adjustable low pressure regulator 354, shown in FIG. 14. Reducing the tension in the belts reduces the compression pressure of the belt 125 on the fibrous body on the mandrel during the curing operation.

At the same time that the solenoid SV–10 is actuated, the counter contacts 103b count out and the counter contacts 103c engaged, this action energizing the timer motors of the timers TR–1, TR–2 and TR–3.

The counting out of the counter contacts 103a effects these additional actions: The value SV–3 is de-energized causing the actuator 322 to move the damper 300 to closed position, interrupting the exhaustion of air form the interior of the mandrel, the solenoid valve SV–4 is deenergized to interrupt flow of compressed air to the air header 358 whereby the air streams from the header are stopped, and the tension on the belt 125 is reduced through the valve SV–10.

Timer TR–2 first times in, energizing the solenoid valve SV–5 to move the dampers 304 and 306 to the partially opened positions shown in FIG. 5. Heated gases from the blower 272 at a reduced pressure and velocity, due to the partially opened position of the damper 304, are delivered into the interior of the mandrel 24 and the gases forced outwardly through the perforations or outlets in the mandrel shell 364, shown in FIG. 7, and through the fibers to partially cure or set the binder in the fibers of the convolutions on the mandrel.

The heated gases are delivered at a restricted pressure and velocity so as to avoid blowing the fibers off the mandrel. This action continues unti the timer TR–3 times out. The timing out of timer TR–3 energizes the solenoid valve SV–6 which releases or vents the air pressure above the piston in the actuator 328 so as to permit the already existent air pressure in the actuator 326 to move the piston in the actuator 326 to its lowermost position and the piston in the actuator 328 to move upwardly to its uppermost position, as shown in FIG. 6, this action fully closing the damper 306 and moving the damper 304 to full open position.

With the damper 304 in full open position, the heated gases from the blower 272 at a maximum pressure and velocity are delivered into the mandrel shell 364 and the gases forced through the outlets in the mandrel shell and through the fibers to complete the curing or setting of the binder throughout the fibers of all of the convolutions on the mandrel.

By first effecting a partial curing of the binder in the fibers on the mandrel by heated gases under comparatively low pressure and velocity, enough of the binder is sufficiently set in the fibers to prevent the fibers from being blown off of the mandrel when the gases at maximum pressure and velocity are delivered through the outlets in the mandrel shell 354 to complete the curing operation. Through this two-step method of curing the fibrous body while on the rotating mandrel, a substantial saving in curing time is effected because during the major curing period the hot gases are delivered at a maximum pressure and velocity to thereby shorten the curing period.

After the binder curing operation is completed, the contacts of time TR–1 time closed, this action actuating the solenoid valve SV–7 to release or vent the air pressure beneath the piston in the cutter actuator 228 which releases the cutter frame 212 to fall or move by gravity around the pivot pins 218, engaging the cutter wheels 224 with the tubular body on the mandrel to cut the body to the desired length as determined by the distance between the two cutters.

This cutting or severing action takes place with the mandrel and fibrous body thereon still being rotated by the belts 125 and 127. It is found that it usually requires from five to fifteen seconds for the cutting wheels to cut entirely through the fibrous body.

A pneumatic actuator 329 is provided for regulating the position of the damper 300, the actuator 329 being actuated by the solenoid valve SV–6 to shift the position of the damper to a partially closed position whenever heat is being diverted through the duct 284 to the hood 21 so as to restrict the amount of heat delivered into the hood.

The timer contacts TR–1a and TR–3a simply terminate the body cutting operation and the binder curing operation. When the timer contacts TR–2a time open, the solenoid SV–5 is deenergized whereby the actuators 326 and 328 move the dampers 304 and 306 to the position illustrated in FIG. 4, and the solenoid valve SV–7 energized to introduce air under pressure into the actuator 228 to elevate the cutter frame 214 and cutters 224 away from the mandrel. The timer contacts TR–2b time open which actuates the four-way solenoid valve SV–2 to a position whereby the actuators 185 move the carriage 110 to its retracted or out-of-use position, illustrated in FIG. 1.

When the carriage 110 reaches its retracted position, it actuates limit switch LS–3 to stop the carriage.

At the same time the timer contacts TR–2b and TR–2a are held in their final position, the contacts TR–2c making contact to energize a circuit through the other contacts of the limit switch LS–3 at the time the carriage 110 actuates one set of contacts of the limit switch LS–3 to close the contacts of the control relay CR–2 to energize the solenoid valve SV–1 causing the actuator 194 to lower the mandrel support arm 109 thus completing the operative steps in the method of operation of the apparatus in forming a tubular fibrous body 32.

With the mandrel supporting arm 109 in its lowermost position out of engagement with the shaft 108 of the mandrel construction, the operator slidably removes the severed waste from the distal end of the mandrel and slidably removes the completed fibrous binder-cured body from the mandrel. The operator then manually severs the waste on the opposite end of the mandrel and removes the same therefrom preparatory to the next body forming operation.

The total binder setting or curing time for a fibrous body of about eight inches interior diameter is usually from one minute to two minutes depending upon the amount of material in the body. The average initial or partial curing time is usually about thirty seconds. In curing the binder on small diameter fibrous bodies having comparatively thin walls the reduced pressure and velocity of the heated air is maintained throughout the curing period and a cure time for fibrous bodies of small diameter may be as low as ten seconds. The total curing time for larger diameter fibrous bodies having comparatively thick walls may require up to three minutes or more.

The illustrations given of curing times and other characteristics are premised upon the use of phenolformaldehyde resin binder and may vary where other binders are utilized. While the percentage of binder by weight in the fibers may vary, it is found that the fibrous product having about twelve percent by weight of binder therein is satisfactory.

While it is preferable to utilize thermosetting binders such as phenolformaldehyde or polyester resin, it is practicable to use thermoplastic binders in the fibers. In utilizing a plastic binder in the fibers, the plastic binder may be delivered into the mat of fibers in powder or flake form. After the winding of the mat into a tubular body on the mandrel is completed, heated gases from the blower 272 may be deliver into the mandrel and through the fibers to soften the plastic binder and thereafter atmospheric air drawn through the tubular fibrous body by the action of the suction blower 290 to cool and set the binder in the fibers.

It is apparent that, within the scope of the invention, modifications and different arrangements may be made other than as herein disclosed, and the present disclosure is illustrative merely, the invention comprehending all variations thereof.

What is claimed is:

1. The method of forming a substantially rigid tubular fibrous body including feeding a binder-bearing mass of fibers to a tubular perforated collector, rotating the collector by a moving surface, wrapping the mass of fibers on the rotating collector by the moving surface and upon itself in a plurality of convolutions forming a tubular body, exerting pressure on the moving surface to compress the mass of fibers as it is wrapped on the collector to provide a predetermined wall thickness throughout a major length of the body, further compressing during said wrapping narrow regions of the mass of fibers adjacent the ends of the tubular body to a substantially greater density than the density of the major portion of the body to form the narrow regions of reduced wall thickness, establishing air flow through the fibers to the interior of the perforated collector during the wrapping of the mass on the collector, and heating the binder in the fibers of the wrapped body on the collector to set the binder while rotating the body and the collector.

2. The method of forming a substantially rigid tubular fibrous body including feeding an binder-bearing mass of glass fibers to a tubular perforated collector, rotating the collector by a moving surface, wrapping the mass of glass fibers on the rotating collector by the moving surface and upon itself in a plurality of convolutions forming a tubular body, exerting pressure on the moving surface to compress the mass of fibers as it is wrapped on the collector to provide a predetermined wall thickness throughout a major length of the body, during said wrapping compressing narrow regions of the mass of fibers adjacent the ends of the tubular body to a substantially greater density than the density of the major portion of the body to form the narrow regions of reduced wall thickness, exhausting air from the interior of the perforated collector and through the fibers on the collector during the wrapping of the mass on the collector, and heating the binder by flowing gases at a binder-setting temperature into the tubular collector and through the fibers of the rotating body.

3. The method of forming a substantially rigid tubular body of fibers including advancing a mass of binder-bearing mineral fibers to a tubular perforated collector, engaging the collector with a moving surface to initially rotate the collector, engaging the advancing mass of fibers with the moving surface, wrapping the mass of fibers by the moving surface in a plurality of successive convolutions on the collector forming a tubular body, establishing air flow through the fibers to the interior of the perforated collector during the wrapping of the mass on the collector, exerting pressure on the moving surface to compress the mass of fibers as the mass is wrapped on the collector to provide a predetermined wall thickness for a major portion of the tubular body, engaging a second moving surface with a first narrow region of the mass of fibers as the mass is wrapped on the collector to compress the fibers of said narrow region to a greater density and form a first narrow region of reduced wall thickness, compressing a second narrow region of the mass of fibers on the collector spaced from the first narrow region forming a second narrow region of reduced wall thickness, and flowing heated gas into the tubular collector and through the perforations and the fibers of the wrapped body for setting the binder in the fibers while rotating the body and the collector.

4. The method according to claim 3 including supporting the advancing mass of fibers adjacent the rotating collector by air streams, and directing the advancing mass by the air streams into engagement with the rotating collector.

5. The method according to claim 3 including the step of severing the rotating body on the collector transversely of its longitudinal axis at the regions of reduced wall thickness.

6. The method according to claim 3 including sizing the body of collected convolutions of fibers to a predetermined exterior diameter.

7. The method of forming a substantially rigid tubular body of glass fibers including feeding a mat of glass fibers impregnated with uncured binder from a supply to a tubular perforated collector at a wrapping station, rotating the collector by a moving surface, engaging the mat by the moving surface, wrapping the mat in successive convolutions on the collector by the moving surface forming a tubular fibrous body on the collector, establishing air flow through the fibers to the interior of the perforated collector during wrapping of the mat on the collector for holding the mat on the collector, exterting pressure on the moving surface to compress the fibers of the mat on the collector by the moving surface, engaging a second moving surface with a narrow region of the mat as it is wrapped on the collector to compress the fibers of said region to a higher density providing the narrow region with reduced wall thickness, tearing the mat on the collector from the supply when a predetermined length of mat has been wrapped on the collector, delivering heated gases under low pressure at low velocity for a short period of time into the rotating tubular collector and through the fibers of the body on the collector at the wrapping station to partially cure the binder, and thereafter delivering heated gases into the rotating collector at increased pressure and increased velocity to accelerate the curing of the binder.

8. The method according to claim 7 including rotating the body of fibers on the collector whereby the peripheral speed of the body is greater than the linear rate of feeding the mat to the collector for stretching the mat as it is wrapped on the collector.

9. The method according to claim 7 including the step of reducing the pressure of the moving surface on the body of fibers on the rotating collector when the wrapping of the mat on the collector is completed.

10. The method according to claim 7 including establishing a heated environment in an enclosure embracing the moving surfaces of a temperature approaching but less than the curing temperature of the binder in the fibers.

11. The method of forming a substantially rigid tubular body of fibers including advancing a mat of binder-bearing fibers to a tubular perforated collector, engaging the collector with a moving surface to initially rotate the collector, engaging the advancing mat of fibers with the moving surface, wrapping the mat of fibers by the moving surface in a plurality of successive convolutions on the collector forming a tubular body, exhausting air from the interior of the perforated collector during the wrapping of the mass of fibers on the collector, exerting pressure on the moving surface to compress the mat of fibers as the mat is wrapped on the collector to provide a predetermined wall thickness for a major portion of the tubular body, engaging a second moving surface with a first narrow region of the mat of fibers as the mat is wrapped on the collector to compress the fibers of said narrow region to a greater density and form a first narrow region of reduced wall thickness and of an exterior diameter less than the diameter of the major portion of the tubular body, compressing a second narrow region of the mat of fibers on the collector spaced from the first narrow region forming a second narrow region of reduced wall thickness and of an interior diameter greater than the interior diameter of the major portion of the tubular body, and flowing heated gas into the tubular collector and through the perforations and the fibers of the body for setting the binder in the fibers while rotating the body and the collector.

References Cited

UNITED STATES PATENTS

| | | | |
|---|---|---|---|
| 2,385,230 | 9/1945 | Perry | 162—122 |
| 3,253,973 | 5/1966 | Anderberg et al. | 156—446 XR |
| 3,347,725 | 10/1967 | Stephens et al. | 156—184 |
| 3,446,684 | 5/1969 | Pall et al. | 156—184 |
| 3,479,239 | 11/1969 | Hullhorst | 156—184 |
| 3,615,964 | 10/1971 | Malone | 156—62.6 |

ROBERT F. WHITE, Primary Examiner

J. H. SILBAUGH, Assistant Examiner

U.S. Cl. X.R.

156—194; 264—91, 119